US011949142B2

(12) United States Patent
Jia et al.

(10) Patent No.: US 11,949,142 B2
(45) Date of Patent: Apr. 2, 2024

(54) FEEDING STRUCTURE, MICROWAVE RADIO FREQUENCY DEVICE AND ANTENNA

(71) Applicants: BEIJING BOE SENSOR TECHNOLOGY CO., LTD., Beijing (CN); BOE TECHNOLOGY GROUP CO., LTD., Beijing (CN)

(72) Inventors: Haocheng Jia, Beijing (CN); Tienlun Ting, Beijing (CN); Ying Wang, Beijing (CN); Jie Wu, Beijing (CN); Liang Li, Beijing (CN); Cuiwei Tang, Beijing (CN); Qiangqiang Li, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 429 days.

(21) Appl. No.: 17/280,873

(22) PCT Filed: Aug. 13, 2020

(86) PCT No.: PCT/CN2020/108821
§ 371 (c)(1),
(2) Date: Mar. 27, 2021

(87) PCT Pub. No.: WO2021/027865
PCT Pub. Date: Feb. 18, 2021

(65) Prior Publication Data
US 2022/0006165 A1 Jan. 6, 2022

(30) Foreign Application Priority Data
Aug. 14, 2019 (CN) ........................ 201910750841.7

(51) Int. Cl.
*H01P 1/18* (2006.01)
*H01P 1/20* (2006.01)
*H01P 5/12* (2006.01)

(52) U.S. Cl.
CPC .................. *H01P 1/18* (2013.01); *H01P 1/20* (2013.01); *H01P 5/12* (2013.01)

(58) Field of Classification Search
CPC .... H01P 1/18; H01P 1/20; H01P 1/184; H01P 5/12; H01P 5/10; H01Q 1/50; H01Q 3/36
See application file for complete search history.

(56) References Cited

U.S. PATENT DOCUMENTS 4,356,462 A * 10/1982 Bowman .................. H01P 5/12 333/136
6,278,340 B1 * 8/2001 Liu .......................... H01P 5/10 333/33
(Continued)

FOREIGN PATENT DOCUMENTS

CN 105896082 A * 8/2016 .............. H01Q 1/22
CN 108808181 A 11/2018
(Continued)

OTHER PUBLICATIONS

Xue Yu, "Microwave Characteristics Modeling of Liquid Crystal Material and Application of Design Method for Polarization Antenna," Master's Thesis, Harbin Institute of Technology, Jan. 31, 2019.
(Continued)

*Primary Examiner* — Seokjin Kim
(74) *Attorney, Agent, or Firm* — HOUTTEMAN LAW LLC

(57) ABSTRACT

A feeding structure is provided, which includes first and second substrates opposite to each other, a reference electrode, and a dielectric layer between the first and second substrates. The first substrate includes a coupling branch and a delay branch, which are respectively connected to two
(Continued)

output terminals of a power divider and form a current loop with the reference electrode, on a side of a first base plate proximal to the dielectric layer. The second substrate includes a receiving electrode on a side of a second base plate proximal to the dielectric layer, the receiving electrode and the coupling branch form a coupling structure, and their orthographic projections on the first base plate at least partially overlap each other. A length of an orthographic projection of both the coupling branch and the receiving electrode on the first base plate is different from a length of the delay branch.

20 Claims, 2 Drawing Sheets

(56) References Cited

U.S. PATENT DOCUMENTS

| | | | | |
|---|---|---|---|---|
| 6,496,147 | B1 * | 12/2002 | Kirino | H01Q 21/0087 333/156 |
| 11,119,364 | B2 * | 9/2021 | Li | H01P 1/184 |
| 2017/0093363 | A1 | 3/2017 | Tabatabai et al. | |
| 2020/0257149 | A1 * | 8/2020 | Li | G02F 1/1343 |
| 2020/0343634 | A1 * | 10/2020 | Wang | H01P 5/12 |
| 2021/0135327 | A1 * | 5/2021 | Wang | H01Q 1/22 |
| 2021/0210851 | A1 * | 7/2021 | Wu | H01Q 21/0087 |

FOREIGN PATENT DOCUMENTS

| | | | | | |
|---|---|---|---|---|---|
| CN | 208654481 | U | | 3/2019 | |
| CN | 109921190 | A | | 6/2019 | |
| CN | 110011038 | A | | 7/2019 | |
| CN | 210628497 | U | | 5/2020 | |
| CN | 113675551 | B | * | 7/2023 | |
| EP | 3609018 | A1 | * | 2/2020 | |
| WO | WO-2014083948 | A1 | * | 6/2014 | H01Q 21/0075 |

OTHER PUBLICATIONS

1 European Patent Office, Extended European search report, dated Aug. 12, 2022 for application No. EP20852132.8.

* cited by examiner

FEEDING STRUCTURE, MICROWAVE RADIO FREQUENCY DEVICE AND ANTENNA

CROSS-REFERENCE TO RELATED APPLICATIONS

This is a National Phase Application filed under 35 U.S.C. 371 as a national stage of PCT/CN2020/108821 filed on Aug. 13, 2020, an application claiming the priority of Chinese patent application No. 201910750841.7, filed on Aug. 14, 2019, the content of each of which is incorporated herein by reference in its entirety.

TECHNICAL FIELD

The present disclosure relates to the field of communication technologies, and in particular to a feeding structure, a microwave radio frequency device, and an antenna.

BACKGROUND

A phase shifter is a device for adjusting (or changing) a phase of an electromagnetic wave, and is widely applied to various communication systems such as a satellite communication system, a phased array radar, a remote sensing and telemetry system, and the like. A dielectric adjustable phase shifter is a device which realizes a phase shift effect by adjusting a dielectric constant of a dielectric layer of the device.

SUMMARY

Embodiments of the present disclosure provide a feeding structure, a microwave radio frequency device, and an antenna.

A first aspect of the present disclosure provides a feeding structure, which includes a first substrate and a second substrate opposite to each other, a reference electrode, and a dielectric layer between the first substrate and the second substrate, wherein

- the first substrate includes a first base plate, and a coupling branch and a delay branch on a side of the first base plate proximal to the dielectric layer, the coupling branch and the delay branch are configured to be connected to two output terminals of a power divider, respectively, and both the delay branch and the coupling branch form a current loop with the reference electrode;
- the second substrate includes a second base plate and a receiving electrode on a side of the second base plate proximal to the dielectric layer, the receiving electrode and the coupling branch form a coupling structure, and an orthographic projection of the receiving electrode on the first base plate and an orthographic projection of the coupling branch on the first base plate at least partially overlap each other; and
- a length of an orthographic projection of both the coupling branch and the receiving electrode on the first base plate is different from a length of the delay branch, such that a phase of a microwave signal transmitted on the coupling structure is different from a phase of a microwave signal transmitted on the delay branch.

In an embodiment, one of the delay branch, the coupling branch and the receiving electrode includes a serpentine line such that the phase of the microwave signal transmitted on the coupling structure is different from the phase of the microwave signal transmitted on the delay branch.

In an embodiment, the delay branch includes the serpentine line.

In an embodiment, the serpentine line includes any one of a rectangular waveform, an S-shape, and a Z-shape.

In an embodiment, the feeding structure further includes the power divider, which includes a signal input terminal, a first signal output terminal, and a second signal output terminal, wherein

- the signal input terminal is configured to receive a microwave signal with a certain power, the first signal output terminal is connected to the delay branch, and the second signal output terminal is connected to the coupling branch.

In an embodiment, the feeding structure further includes the power divider, which includes a signal input terminal, a signal matching terminal, a first signal output terminal, and a second signal output terminal,

- the signal input terminal is configured to receive a microwave signal with a certain power, the first signal output terminal is connected to the delay branch, and the second signal output terminal is connected to the coupling branch; and
- the signal matching terminal is configured to adjust microwave signals output from the first signal output terminal and the second signal output terminal by a signal introduced by the signal matching terminal, thereby causing the microwave signals output from the first signal output terminal and the second signal output terminal to have a certain phase difference therebetween.

In an embodiment, the power divider includes any one of a 3 DB bridge, a coupler, and a quadrature hybrid network.

In an embodiment, the power divider, the delay branch and the coupling branch are all on the first base plate.

In an embodiment, the delay branch, the coupling branch and the reference electrode form any one of a microstrip transmission structure, a stripline transmission structure, a coplanar waveguide transmission structure, and a substrate-integrated waveguide transmission structure.

In an embodiment, the feeding structure further includes a support member between the first substrate and the second substrate, wherein the support member is configured to maintain a distance between the first substrate and the second substrate.

In an embodiment, the dielectric layer includes air.

A second aspect of the present disclosure provides a microwave radio frequency device, which includes the feeding structure according to any one of the embodiments of the first aspect of the present disclosure.

In an embodiment, the microwave radio frequency device further includes a phase shifting structure including:

- a third base plate and a fourth base plate opposite to each other;
- a first transmission line on the third base plate;
- a second transmission line on a side of the fourth base plate proximal to the first transmission line;
- a liquid crystal layer between the first transmission line and the second transmission line; and
- a ground electrode on a side of the third base plate distal to the first transmission line.

In an embodiment, at least one of the first transmission line and the second transmission line is a microstrip.

In an embodiment, each of the first transmission line and the second transmission line is a comb-shaped electrode, and the ground electrode is a plate-shaped electrode.

In an embodiment, the delay branch of the feeding structure is connected to the first transmission line of the phase shifting structure, and the receiving electrode of the feeding structure is connected to the second transmission line of the phase shifting structure.

In an embodiment, the reference electrode of the feeding structure is on a side of the first base plate distal to the dielectric layer, and is connected to the ground electrode of the phase shifting structure.

In an embodiment, the liquid crystal layer includes positive liquid crystal molecules or negative liquid crystal molecules;

an angle between a long axis direction of each of the positive liquid crystal molecules and a plane where the third base plate is located is greater than 0 degrees and less than or equal to 45 degrees; and an angle between a long axis direction of each of the negative liquid crystal molecules and the plane where the third base plate is located is greater than 45 degrees and less than 90 degrees.

In an embodiment, the microwave radio frequency device includes a phase shifter or a filter.

A third aspect of the present disclosure provides an antenna, which includes the microwave radio frequency device according to any one of the embodiments of the second aspect of the present disclosure.

DETAILED DESCRIPTION

To enable one of ordinary skill in the art to better understand technical solutions of the present disclosure, the present disclosure will be further described in detail below with reference to the accompanying drawings and exemplary embodiments.

Unless otherwise defined, technical or scientific terms used herein should have the same meaning as commonly understood by one of ordinary skill in the art to which the present disclosure belongs. The terms of "first", "second" and the like used in the present disclosure are not intended to indicate any order, quantity, or importance, but rather are used for distinguishing one element from another. Further, the term of "a", "an", "the" or a similar referent does not denote a limitation of quantity, but rather denote the presence of at least one element. The term of "comprising", "including", or the like, means that the element or item preceding the term contains the element or item listed after the term and the equivalent thereof, but does not exclude the presence of other elements or items. The terms of "connected", "coupled", and the like are not limited to physical or mechanical connections, but may include electrical connections, whether direct or indirect connections. The terms of "upper", "lower", "left", "right", and the like are used only for indicating relative positional relationships, and when an absolute position of the object being described is changed, the relative positional relationships may also be changed accordingly.

The inventors of the present inventive concept have found that, a conventional phase shifter with a dielectric having an adjustable refractive index includes a single-line transmission structure, and adjusts a phase velocity of a signal by changing the refractive index of the dielectric, to achieve a phase shifting effect. However, such a phase shifter has a large loss and a low phase shifting degree per unit loss. In view of the foregoing, embodiments of the present disclosure provide a feeding structure, a microwave radio frequency device, and an antenna that have a high phase shifting degree per unit loss.

It should be noted that, the feeding structure provided in the following embodiments of the present disclosure may be widely applied to differential mode power feeding of two layers of transmission lines inside a dual-substrate. For example, the feeding structure may be applied to a microwave radio frequency device, and the microwave radio frequency device may be a differential mode signal line, a filter, a phase shifter, and the like. In the following embodiments, description is made by taking a microwave radio frequency device as a phase shifter.

Figure 3:
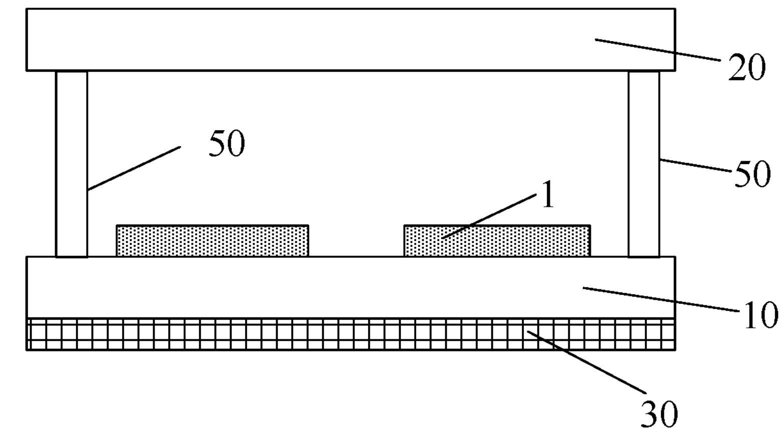
FIG. 3 is a cross-sectional view of the feeding structure taken along line A-A' as shown in FIG. 2.
Figure 4:
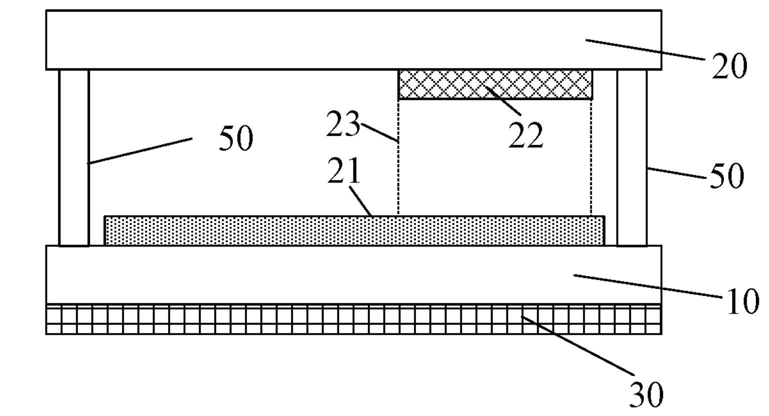
FIG. 4 is a cross-sectional view of the feeding structure taken along line B-B' as shown in FIG. 2.
Figure 5:
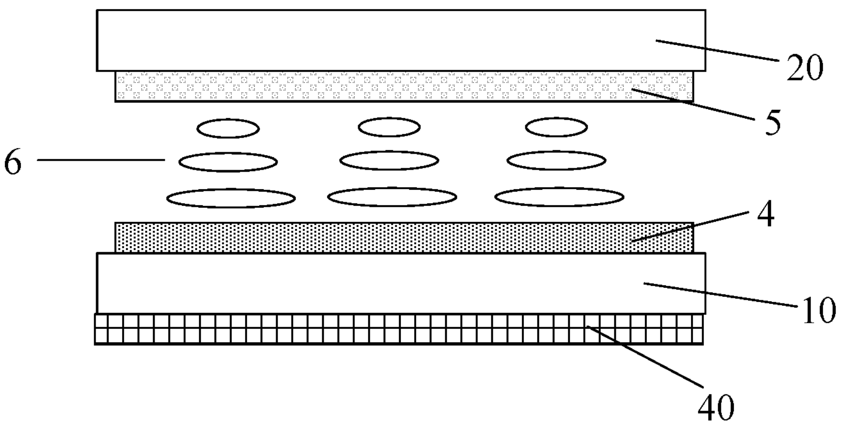
FIG. 5 is a cross-sectional view of a phase shifting structure according to an embodiment of the present disclosure.

For example, the phase shifter (i.e., the microwave radio frequency device) may include not only the feeding structure (as shown in FIGS. 1 to 4) but also a phase shifting structure (as shown in FIG. 5). As shown in FIG. 5, the phase shifting structure may include: a first base plate 10 and a second base plate 20 disposed opposite to each other, a first transmission line 4 disposed on the first base plate 10, a second transmission line 5 disposed on a side of the second base plate 20 proximal to the first transmission line 4, a dielectric layer disposed between a layer where the first transmission line 4 is located and a layer where the second transmission line 5 is located, and a ground electrode 40 which may be disposed on a side of the first base plate 10 distal to the first transmission line 4. For example, the dielectric layer includes, but is not limited to, a liquid crystal layer 6, and the following embodiments will be described by taking an example in which the dielectric layer is the liquid crystal layer 6.

For example, each of the first transmission line 4 and the second transmission line 5 may be a microstrip (which may also be referred to as a microstrip line), and in this case the ground electrode 40 is disposed on the side of the first base plate 10 distal to the first transmission line 4. Each of the first transmission line 4 and the second transmission line 5 may be a comb-shaped electrode, and the ground electrode 40 may be a plate-shaped electrode. That is, the first transmission line 4, the second transmission line 5, and the ground electrode 40 may form a microstrip transmission structure (i.e., a transmission structure in a form of the microstrip). Alternatively, the first transmission line 4, the second transmission line 5, and the ground electrode 40 may form any one of a stripline transmission structure, a coplanar waveguide transmission structure, and a substrate-integrated waveguide transmission structure, which is not enumerated one by one herein.

Figure 2:
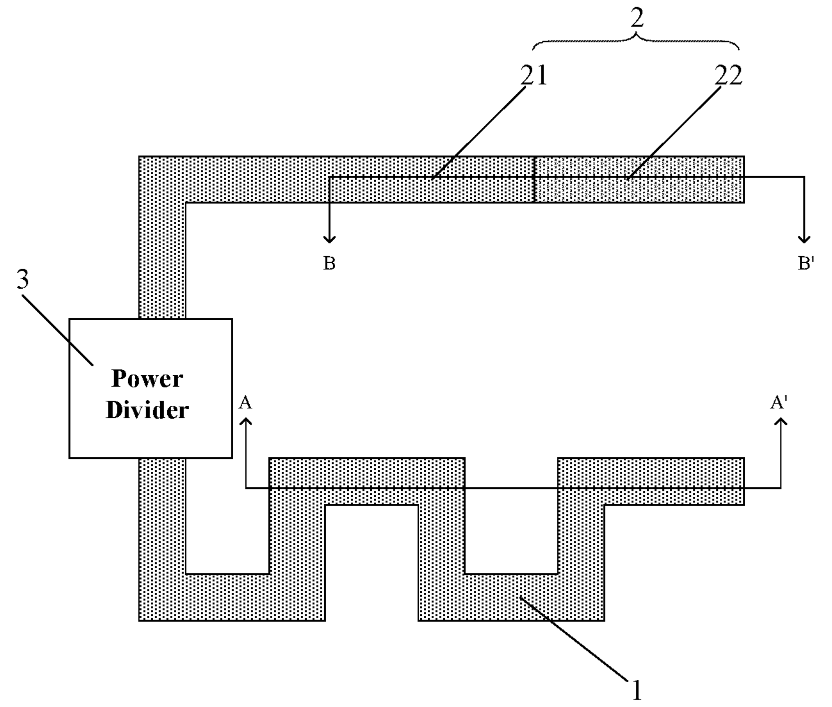
FIG. 2 is a schematic top view of a feeding structure according to an embodiment of the present disclosure.

In a first aspect, embodiments of the present disclosure provide a feeding structure (e.g., a dual-substrate differential mode feeding structure), as shown in FIGS. 1 to 4. The feeding structure includes a first substrate and a second substrate which are arranged opposite to each other, a dielectric layer filled between the first substrate and the second substrate, and a reference electrode. For example, the first substrate may include: a first base plate 10, a coupling branch 21 and a delay branch 1 disposed on a side of the first base plate 10 proximal to the dielectric layer, and the coupling branch 21 and the delay branch 1 are configured to be connected to two output terminals (e.g., a first signal output terminal and a second signal output terminal to be described below) of a power divider 3, respectively. Both the coupling branch 21 and the delay branch 1 form a current loop with the reference electrode (e.g., the ground electrode 30). The second substrate may include: a second base plate 20, and a receiving electrode 22 disposed on a side of the second base plate 20 proximal to the dielectric layer. The receiving electrode 22 and the coupling branch 21 form a coupling structure 2, and an orthographic projection of the receiving electrode 22 on the first base plate 10 and an orthographic projection of the coupling branch 21 on the first base plate 10 at least partially overlap each other. An overlapping region of the receiving electrode 22 and the coupling branch 21 may form a capacitive region (or capacitor region) 23, as shown in FIG. 4. Further, a length of an orthographic projection of both the coupling branch 21 and the receiving electrode 22 on the first base plate 10 (e.g., a size in the horizontal direction of the orthographic projection of both the coupling branch 21 and the receiving electrode 22 on the plan view shown in FIG. 2) is different from a length of the delay branch 1 (e.g., a length of the curve represented by an orthographic projection of the delay branch 1 on the plan view shown in FIG. 2), such that a phase of a microwave signal transmitted on the coupling structure 2 is different from a phase of the microwave signal transmitted on the delay branch 1.

It should be noted herein that, the length of the orthographic projection of both the coupling branch 21 and the receiving electrode 22 on the first base plate 10 refers to a sum of the lengths of the coupling branch 21 and the receiving electrode 22 minus a length of the overlapping region of the coupling branch 21 and the receiving electrode 22. The dielectric layer of the feeding structure includes, but is not limited to, air, and the present embodiment is described by taking an example in which the dielectric layer is air. Alternatively, the dielectric layer may be an inert gas or the like.

For example, in an embodiment of the present disclosure, the ground electrode 30 is generally used as the reference electrode. Alternatively, any reference electrode capable of having a certain voltage difference with the coupling branch 21 and the delay branch 1 may be employed, and the present embodiment is described by taking an example in which the reference electrode is the ground electrode 30. It should be noted that, microwave signals transmitted on the delay branch 1 and the coupling branch 21 may be high-frequency signals. In the present embodiment, the current loop means that a certain voltage difference exists between both the delay branch 1 and the coupling branch 21 and the ground electrode 30, each of the delay branch 1 and the coupling branch 21 forms a capacitance or an electrical conductance with the ground electrode 30; meanwhile, the delay branch 1 is connected to the first transmission line 4 of the phase shifting structure shown in FIG. 5, the receiving electrode 22 is connected to the second transmission line 5 of the phase shifting structure shown in FIG. 5, to transmit a microwave signal, and an electric current finally flows back to the ground electrode 30, i.e., the current loop is formed.

A specific position of the ground electrode 30 in the present embodiment depends on the transmission structure formed by the ground electrode 30, the coupling branch 21 and the delay branch 1. Specifically, the transmission structure formed by the delay branch 1, the coupling branch 21 and the ground electrode 30 in the present embodiment includes, but is not limited to, any one of the microstrip transmission structure, the stripline transmission structure, the coplanar waveguide transmission structure, and the substrate-integrated waveguide transmission structure. In the following embodiments, in order to describe the feeding structure according to the present embodiment in combination with the phase shifting structure shown in FIG. 5, the present embodiment is described by taking an example in which the delay branch 1, the coupling branch 21, and the ground electrode 30 form the microstrip transmission structure. In this case, the ground electrode 30 of the feeding structure is located on the side of the first base plate 10 distal to the dielectric layer, and is connected to the ground electrode 40 of the phase shifting structure. In addition, the ground electrode 30 of the feeding structure and the ground electrode 40 of the phase shifting structure may be a one-piece structure.

In an embodiment of the present disclosure, the delay branch 1 may output the microwave signal transmitted thereon to the first transmission line 4 of the phase shifting structure. The coupling branch 21 may couple the microwave signal transmitted thereon to the receiving electrode 22, and the receiving electrode 22 may output the microwave signal to the second transmission line 5 of the phase shifting structure.

As described above, the length of the orthographic projection of both the coupling branch 21 and the receiving electrode 22 on the first base plate 10 is different from the length of the delay branch 1 in the embodiments of the present disclosure, such that the phase of the microwave signal transmitted on the coupling structure 2 and the phase of the microwave signal transmitted on the delay branch 1 are different. In this way, a certain voltage difference can be formed between the microwave signal (e.g., high frequency signal) transmitted on the first transmission line 4 and the microwave signal (e.g., high frequency signal) transmitted on the second transmission line 5 in the phase shifting structure, such that the first transmission line 4 and the second transmission line 5 form a liquid crystal capacitor with a certain capacitance in the overlapping region. The voltage difference between the microwave signal on the first transmission line 4 and the microwave signal on the second transmission line 5 shown in FIG. 5 is greater than a voltage difference between a single transmission line and a ground electrode in the prior art. Thus, the capacitance of the liquid crystal capacitor formed by the first transmission line 4 and the second transmission line 5 is greater than a capacitance of a liquid crystal capacitor formed by the single transmission line and the ground electrode in the prior art. Therefore, when different voltages are respectively applied to the first transmission line 4 and the second transmission line 5 to cause the liquid crystal molecules in the liquid crystal layer 6 to rotate so as to shift a phase of a microwave signal, a phase shifting degree of a phase shifter including the feeding structure (e.g., the dual-substrate differential mode feeding structure) according to the present embodiment is relatively large because the capacitance of the liquid crystal capacitor of the feeding structure is relatively large.

In order to make the advantageous effect of the dual-substrate differential mode feeding structure in the present embodiment prominent, explanation is further provided by taking an example in which the length of the delay branch 1 is greater than the length of the orthographic projection of both the coupling branch 21 and the receiving electrode 22 on the first base plate 10. The feeding structure may further include a power divider 3. If a microwave signal with a power P is input into the power divider 3, after the microwave signal with the power P is processed by the power divider 3, the power divider 3 may output to the delay branch 1, a microwave signal with a power P/2 and a phase 270°, and may output to the coupling branch 21, a microwave signal with a power P/2 and a phase 90°. Thus, a phase difference between the microwave signals output from the two branches may be 180°, i.e., a phase difference between the microwave signals transmitted to the first transmission line 4 and the second transmission line 5 of the phase shifting structure is 180°. In this case, a voltage carried by the microwave signal input to the first transmission line 4 of the phase shifting structure from the delay branch 1 may be −1V, and a voltage carried by the microwave signal input to the second transmission line 5 of the phase shifting structure after being coupled from the coupling branch 21 to the receiving electrode 22 may be 1V, thereby implementing a phase shifting degree of 180° for the microwave signal. Compared with a liquid crystal capacitor with other phase shifting degrees, the capacitance of the liquid crystal capacitor generated by the first transmission line 4 and the second transmission line 5 is the largest, thereby achieving the maximum phase shifting degree of the phase shifter.

It should be noted that, the above embodiment only exemplifies that the microwave signal on the delay branch 1 and the microwave signal on the coupling branch 21 have the phase difference of 180° therebetween, but the present disclosure is not limited thereto. In practice, the phase difference between the microwave signal input to the first transmission line 4 from the delay branch 1 and the microwave signal input to the second transmission line 5 from the receiving electrode 22 may be adjusted by adjusting a length of one, which is a serpentine line, of the delay branch 1, the receiving electrode 22, and the coupling branch 21.

As mentioned above, in some embodiments of the present disclosure, one of the delay branch 1, the coupling branch 21 and the receiving electrode 22 includes the serpentine line, such that the phase of the microwave signal transmitted on the coupling structure 2 and the phase of the microwave signal transmitted on the delay branch 1 are different. The serpentine line is employed to cause the length of the orthographic projection of both the coupling branch 21 and the receiving electrode 22 on the first base plate to be different from the length of the delay branch 1, thereby not increasing a volume of the feeding structure.

For example, in an embodiment of the present disclosure, the delay branch 1 of the feeding structure may be designed as the serpentine line, i.e. the length of the delay branch 1 is greater than a length of the coupling branch 21, than a length of the receiving electrode 22, and/or than the length of the orthographic projection of both the coupling branch 21 and the receiving electrode 22 on the first base plate 10. If the power divider 3 equally divides the microwave signal received by a signal input terminal of the power divider 3 (e.g., a lower terminal of the power divider 3 shown in FIG. 1) and outputs the divided microwave signals to the delay branch 1 and the coupling branch 21, respectively. In this case, since the length of the delay branch 1 is greater than the length of the coupling branch 21, a phase of the microwave signal output from the delay branch 1 will be delayed relative to a phase of the microwave signal output from the coupling branch 21.

As mentioned above, in some embodiments of the present disclosure, the delay branch 1 of the feeding structure may be designed as the serpentine line, i.e., the length of the delay branch 1 is designed to be greater than the length of the coupling branch 21. In this way, if the power divider 3 equally divides the microwave signal received by its signal input terminal and outputs the divided microwave signals to the delay branch 1 and the coupling branch 21, respectively. In this case, since the length of the delay branch 1 is greater than that of the coupling branch 21, the phase of the microwave signal output from the delay branch 1 is delayed relative to the phase of the microwave signal output from the coupling branch 21.

The above design may be carried out because the longer a signal line is, the greater a loss of the microwave signal is. Further, the microwave signal transmitted by the coupling branch 21 needs to be coupled to the receiving electrode 22 and then is transmitted to the second transmission line 5, during which a loss of the microwave signal is also caused. Thus, the losses on the two branches are equal to each other or substantially equal to each other. If the length of the coupling branch 21 is increased, the loss of the microwave signal transmitted by the coupling branch 21 will increase. In view of this, the length of the delay branch is designed to be greater than the length of the coupling branch 21.

It should be noted that, in an embodiment of the present disclosure, the coupling branch 21 and/or the receiving electrode 22 of the feeding structure may be designed as serpentine line(s), as long as it is ensured that there is a certain difference between the phase of the microwave signal transmitted to the first transmission line 4 and the phase of the microwave signal transmitted to the second transmission line 5. In the following embodiments, description will be made by taking an example in which only the delay branch 1 is a serpentine line.

Figure 1:
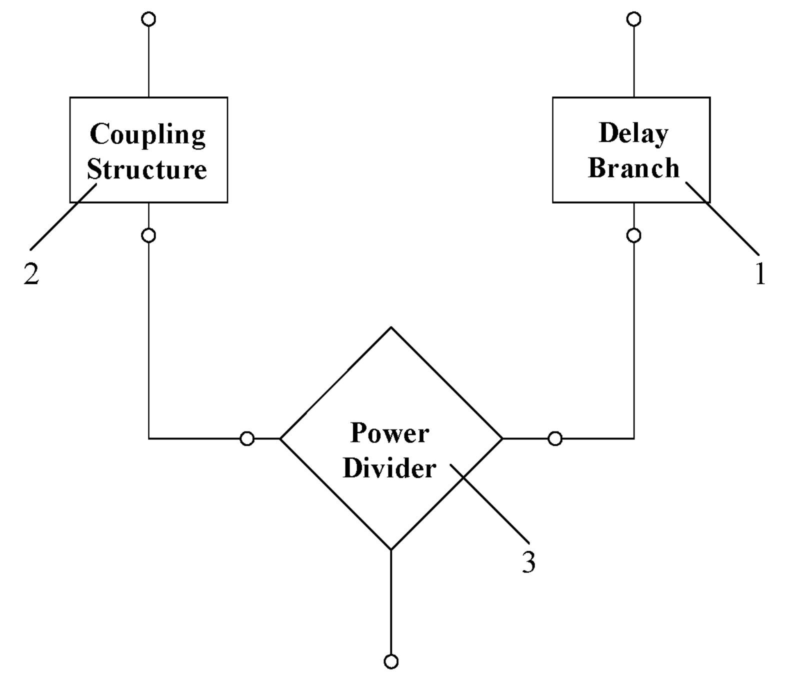
FIG. 1 is a schematic diagram showing a structure of a feeding structure according to an embodiment of the present disclosure.

In some embodiments of the present disclosure, the feeding structure includes not only the above-described structure (e.g., the first substrate, the second substrate, the reference electrode (e.g., the ground electrode 30), and the dielectric layer filled between the first substrate and the second substrate) but also the power divider 3, and the power divider 3 may have a three-terminal T-shaped structure, or may have a four-terminal structure (as shown in FIG. 1). However, the present disclosure is not limited to the power divider 3 having one of the above two structures. The feeding structure according to the present embodiment will be further described below by taking examples in which the power divider have three terminals or four terminals. In a case where the power divider 3 has the three-terminal structure, the power divider 3 includes the signal input terminal (the lower terminal shown in FIG. 1), a first signal output terminal (a right terminal shown in FIG. 1), and a second signal output terminal (a left terminal shown in FIG. 1). For example, the first signal output terminal is connected to the delay branch 1 and the second signal output terminal is connected to the coupling branch 21 (as shown in FIG. 2). When a microwave signal with the power P is received by the signal input terminal, the power divider 3 processes the microwave signal, and the powers of the microwave signals output from the first signal output terminal and the second signal output terminal of the power divider 3 may be both P/2. Since the delay branch 1 is the serpentine line, the phase of the microwave signal transmitted via the delay branch 1 is delayed relative to the phase of the microwave signal transmitted via the coupling branch 21. Thus, a certain phase difference exists between the microwave signal transmitted from the delay branch 1 to the first transmission line 4 and the microwave signal transmitted from the receiving electrode 22 to the second transmission line 5, such that a certain liquid crystal capacitance is formed in the overlapping region of the first transmission line 4 and the second transmission line 5, thereby realizing the corresponding phase shifting degree of the phase shifter.

In a case where the power divider 3 has the four-terminal structure, the power divider 3 includes the signal input terminal (the lower terminal as shown in FIG. 1), a signal matching terminal (an upper terminal as shown in FIG. 1), the first signal output terminal (the right terminal as shown in FIG. 1), and the second signal output terminal (the left terminal as shown in FIG. 1). For example, the first signal output terminal is connected to the delay branch 1 and the second signal output terminal is connected to the coupling branch 21 (as shown in FIG. 2). When a microwave signal with the power P is input to the signal input terminal, the power divider 3 processes the microwave signal, and the powers of the microwave signals output by the first signal output terminal and the second signal output terminal of the power divider 3 may both be approximately P/2. The signal matching terminal, by introducing a signal, may adjust the microwave signals output from the first signal output terminal and the second signal output terminal to have a certain phase difference therebetween. For example, in a case where the microwave signal output from each of the first signal output terminal and the second signal output terminal is sin $\Phi 1$, the signal introduced by the signal matching terminal may be sin $\Phi 2$ ($\Phi 2-\Phi 1=120$ degrees), and the above-mentioned "adjustment" may refer to adding sin $\Phi 2$ to the microwave signal sin $\Phi 1$ output from the first signal output terminal or the second signal output terminal, such that $\sin \Phi 2+\sin \Phi 1=2 \sin((\Phi 2+\Phi 1)/2)\cos((\Phi 2-\Phi 1)/2)=\sin(\Phi 2+\Phi 1)/2)$. That is, before the first signal output terminal and the second signal output terminal transmit the microwave signals to the delay branch 1 and the coupling branch 21, respectively, there may be a certain phase difference between the microwave signals output from the first signal output terminal and the second signal output terminal. Further, since the delay branch 1 is the serpentine line, the phase of the microwave signal transmitted via the delay branch 1 is delayed relative to the phase of the microwave signal transmitted via the coupling branch 21. Therefore, a certain phase difference exists between the microwave signal transmitted from the delay branch 1 to the first transmission line 4 and the microwave signal transmitted from the receiving electrode 22 to the second transmission line 5, such that a certain liquid crystal capacitance is formed in the overlapping region of the first transmission line 4 and the second transmission line 5, thereby realizing a corresponding phase shifting degree of the phase shifter.

For example, the power divider 3 having the four terminals described above includes, but is not limited to, a known 3 DB bridge, a known coupler, or a known quadrature hybrid network, and detailed description thereof is omitted herein to make the present specification brief.

In some embodiments of the present disclosure, the serpentine line may have any one of a rectangular waveform (e.g., a square waveform), an S-shape (or a wave shape), and a Z-shape (e.g., a zigzag shape). Of course, the serpentine line is not limited to these structures, and a shape of the serpentine line may be designed according to an impedance requirement of the feeding structure.

In some embodiments of the present disclosure, the power divider 3, the delay branch 1 and the coupling branch 21 may all be provided on the first base plate 10. In this way, a thickness of the feeding structure can be small. In addition, the above arrangement enables that the delay branch 1 and the coupling branch 21 can be formed by a one-step patterning process, thereby reducing process steps and improving the production efficiency.

In some embodiments of the present disclosure, the feeding structure may further include at least one support member 50 between the first substrate and the second substrate for maintaining a distance between the first substrate and the second substrate, as shown in FIGS. 3 and 4.

In some embodiments of the present disclosure, each of the first base plate 10 and the second base plate 20 may be a glass base plate having a thickness of 100 microns to 1000 microns, may be a sapphire base plate, or may be a polyethylene terephthalate base plate, a triallyl cyanurate base plate, or a polyimide transparent flexible base plate, which has a thickness of 10 microns to 500 microns. In addition, at least one of the first base plate 10 and the second base plate 20 may be a high-purity quartz glass base plate having an extremely low dielectric loss. Compared with the common glass base plate, the first base plate 10 and the second base plate 20 which are the quartz glass base plates can effectively reduce the loss of a microwave, such that the phase shifter can have a low power consumption and a high signal-to-noise ratio. For example, the high-purity quartz glass may refer to quartz glass in which a weight percentage of $SiO_2$ is greater than or equal to 99.9%.

In some embodiments of the present disclosure, a material of each of the delay branch 1, the coupling branch 21, the receiving electrode 22, the first transmission line 4, the second transmission line 5, the ground electrode 30, and the ground electrode 40 may be a metal such as aluminum, silver, gold, chromium, molybdenum, nickel or iron.

Alternatively, each of the first transmission line 4 and the second transmission line 5 may be made of a transparent conductive oxide (e.g., indium tin oxide (ITO)).

For example, the liquid crystal molecules in the liquid crystal layer 6 may be positive liquid crystal molecules or negative liquid crystal molecules. It should be noted that, in a case where the liquid crystal molecules are positive liquid crystal molecules, an angle between a long axis direction of each liquid crystal molecule and a plane where the first base plate 10 or the second base plate 20 is located is greater than zero degrees and is equal to or less than 45 degrees, in an embodiment of the present disclosure. In a case where the liquid crystal molecules are negative liquid crystal molecules, an angle between the long axis direction of each liquid crystal molecule and the plane where the first base plate 10 or the second base plate 20 is located is greater than 45 degrees and less than 90 degrees, in an embodiment of the present disclosure. As such, it can be ensured that, after the liquid crystal molecules are rotated, a dielectric constant of the liquid crystal layer is changed, thereby achieving the purpose of phase shifting.

In a second aspect, embodiments of the present disclosure provide a microwave radio frequency device including the dual-substrate feeding structure according to any one of the above embodiments, and the microwave radio frequency device may include, but is not limited to, a filter or a phase shifter. In addition, the microwave radio frequency device may further include the phase shifting structure as shown in FIG. 5.

In a third aspect, embodiments of the present disclosure provide a liquid crystal antenna, which includes the phase shifter (i.e., the microwave radio frequency device) according to any one of the above embodiments. In addition, the liquid crystal antenna may further include at least two patch units disposed on a side of the second base plate 20 distal to the liquid crystal dielectric layer; each side, which is parallel to a plane where the first base plate 10 is located, of the first transmission line 4 may be provided with a plurality of electrode bars (not shown) spaced apart from each other by a constant interval, and a gap between any adjacent two of the patch units corresponds to (e.g., is equal to) a gap between any adjacent two of the electrode bars. In this way, the microwave signal phase-adjusted by any one of the phase shifters as described above can be radiated from the gap between any adjacent two of the patch units.

It should be understood that the above embodiments are merely exemplary embodiments adopted to explain the principle of the present disclosure, and the present disclosure is not limited thereto. It will be apparent to one of ordinary skill in the art that various changes and modifications may be made without departing from the scope of the present disclosure as defined by the appended claims. Such changes and modifications also fall within the scope of the present disclosure.

What is claimed is:

1. A feeding structure, comprising a first substrate and a second substrate opposite to each other, and a dielectric layer between the first substrate and the second substrate, wherein the first substrate comprises a first base plate, and a coupling branch and a delay branch on a side of the first base plate proximal to the dielectric layer, the coupling branch and the delay branch are configured to be connected to two output terminals of a power divider, respectively;

the second substrate comprises a second base plate and a receiving electrode on a side of the second base plate proximal to the dielectric layer, the receiving electrode and the coupling branch form a coupling structure, and an orthographic projection of the receiving electrode on the first base plate and an orthographic projection of the coupling branch on the first base plate at least partially overlap each other; and a length of an orthographic projection of both the coupling branch and the receiving electrode on the first base plate is different from a length of the delay branch, such that a phase of a microwave signal transmitted on the coupling structure is different from a phase of a microwave signal transmitted on the delay branch.

2. The feeding structure according to claim 1, further comprising a reference electrode, wherein both the delay branch and the coupling branch form a current loop with the reference electrode;

both the orthographic projection of the coupling branch on the first base plate and an orthographic projection of the delay branch on the first base plate are within an orthographic projection of the reference electrode on the first base plate; and one of the delay branch, the coupling branch and the receiving electrode comprises a serpentine line such that the phase of the microwave signal transmitted on the coupling structure is different from the phase of the microwave signal transmitted on the delay branch.

3. The feeding structure according to claim 2, wherein the delay branch comprises the serpentine line.

4. The feeding structure according to claim 2, wherein the serpentine line comprises any one of a rectangular waveform, an S-shape, and a Z-shape.

5. The feeding structure according to claim 1, further comprising the power divider, which comprises a signal input terminal, a first signal output terminal, and a second signal output terminal, wherein the signal input terminal is configured to receive a microwave signal with a certain power, the first signal output terminal is connected to the delay branch, and the second signal output terminal is connected to the coupling branch.

6. The feeding structure according to claim 1, further comprising the power divider, which comprises a signal input terminal, a signal matching terminal, a first signal output terminal, and a second signal output terminal, wherein the signal input terminal is configured to receive a microwave signal with a certain power, the first signal output terminal is connected to the delay branch, and the second signal output terminal is connected to the coupling branch; and the signal matching terminal is configured to adjust microwave signals output from the first signal output terminal and the second signal output terminal by a signal introduced by the signal matching terminal, thereby causing the microwave signals output from the first signal output terminal and the second signal output terminal to have a certain phase difference therebetween.

7. The feeding structure according to claim 6, wherein the power divider comprises any one of a 3DB bridge, a coupler, and a quadrature hybrid network.

8. The feeding structure according to claim 5, wherein the power divider, the delay branch and the coupling branch are all on the first base plate.

9. The feeding structure according to claim 1, further comprising a reference electrode, wherein both the delay branch and the coupling branch form a current loop with the reference electrode; and the delay bunch, the coupling branch and the reference electrode form any one of a microstrip transmission structure, a stripline transmission structure, a coplanar waveguide transmission structure, and a substrate-integrated waveguide transmission structure.

10. The feeding structure according to claim 1, further comprising a support member between the first substrate and the second substrate, wherein the support member is configured to maintain a distance between the first substrate and the second substrate.

11. The feeding structure according to claim 1, wherein the dielectric layer comprises air.

12. A microwave radio frequency device, comprising the feeding structure according to claim 1.

13. The microwave radio frequency device according to claim 12, further comprising a phase shifting structure comprising:

a third base plate and a fourth base plate opposite to each other;

a first transmission line on the third base plate;

a second transmission line on a side of the fourth base plate proximal to the first transmission line;

a liquid crystal layer between the first transmission line and the second transmission line; and a ground electrode on a side of the third base plate distal to the first transmission line.

14. The microwave radio frequency device according to claim 13, wherein at least one of the first transmission line and the second transmission line is a microstrip.

15. The microwave radio frequency device according to claim 13, wherein each of the first transmission line and the second transmission line is a comb-shaped electrode, and the ground electrode is a plate-shaped electrode.

16. The microwave radio frequency device according to claim 13, wherein the delay branch of the feeding structure is connected to the first transmission line of the phase shifting structure; and the receiving electrode of the feeding structure is connected to the second transmission line of the phase shifting structure.

17. The microwave radio frequency device according to claim 13, wherein the feeding structure further comprises a reference electrode, and both the delay branch and the coupling branch form a current loop with the reference electrode, and the reference electrode of the feeding structure is on a side of the first base plate distal to the dielectric layer, and is connected to the ground electrode of the phase shifting structure.

18. The microwave radio frequency device according to claim 13, wherein the liquid crystal layer comprises positive liquid crystal molecules or negative liquid crystal molecules;

an angle between a long axis direction of each of the positive liquid crystal molecules and a plane where the third base plate is located is greater than 0 degrees and less than or equal to 45 degrees; and an angle between a log axis direction of each of the negative liquid crystal molecules and the plane where the third base plate is located is greater than 45 degrees and less than 90 degrees.

19. The microwave radio frequency device according to claim 12, wherein the microwave radio frequency device comprises a phase shifter or a filter.

20. An antenna, comprising the microwave radio frequency device according to claim 12.

* * * * *